United States Patent
Smith et al.

(10) Patent No.: US 10,393,196 B2
(45) Date of Patent: Aug. 27, 2019

(54) ENGINE ACCESSORY DISCONNECT SYSTEM

(71) Applicant: The Boeing Company, Chicago, IL (US)

(72) Inventors: Paul R. Smith, Kirkland, WA (US); Victoria L. Garcia, Everett, WA (US); Jerry E. Farstad, Seattle, WA (US); Kenneth B. Dunkelberg, Seattle, WA (US); Ernest H. Kanning, Redmond, WA (US); Kyle A. Peterson, Kirkland, WA (US); Joel R. Will, St. Louis, MO (US); Michel G. Malett, Edmonds, WA (US)

(73) Assignee: The Boeing Company, Chicago, IL (US)

( * ) Notice: Subject to any disclaimer, the term of this patent is extended or adjusted under 35 U.S.C. 154(b) by 138 days.

(21) Appl. No.: 15/619,527

(22) Filed: Jun. 11, 2017

(65) Prior Publication Data

US 2018/0355928 A1    Dec. 13, 2018

(51) Int. Cl.
| | |
|---|---|
| *F02C 7/32* | (2006.01) |
| *F16D 9/00* | (2006.01) |
| *G07C 5/00* | (2006.01) |
| *F01D 21/04* | (2006.01) |
| *F16D 48/06* | (2006.01) |

(52) U.S. Cl.
CPC ......... *F16D 48/064* (2013.01); *F01D 21/045* (2013.01); *F02C 7/32* (2013.01); *F16D 9/00* (2013.01); *G07C 5/006* (2013.01); *F05D 2260/96* (2013.01); *F05D 2270/334* (2013.01); *F16D 2500/10418* (2013.01); *F16D 2500/3161* (2013.01)

(58) Field of Classification Search
None
See application file for complete search history.

(56) References Cited

U.S. PATENT DOCUMENTS

| | | | |
|---|---|---|---|
| 7,296,670 | B2 | 11/2007 | Howard et al. |
| 8,963,391 | B2 * | 2/2015 | Grosskopf ............... F01D 5/026 310/100 |
| 2004/0090195 | A1 * | 5/2004 | Motsenbocker ........ B63B 43/18 318/109 |
| 2016/0094172 | A1 * | 3/2016 | Oesterheld .............. F16F 15/10 322/4 |
| 2016/0101849 | A1 * | 4/2016 | Liegeois ................. B64C 25/34 244/50 |
| 2016/0334771 | A1 * | 11/2016 | Laulagnet .............. G06Q 10/06 |
| 2017/0350459 | A1 * | 12/2017 | Rice ...................... F16D 35/005 |
| 2018/0216678 | A1 * | 8/2018 | Legros .................... F16D 48/10 |

* cited by examiner

*Primary Examiner* — Rami Khatib
(74) *Attorney, Agent, or Firm* — McDonnell Boehnen Hulbert & Berghoff LLP

(57) ABSTRACT

An example system for disconnecting a driven member from a driving member is described. The system includes a vibration detection device configured to output vibration signals indicative of vibration levels of the driven member. The system also includes a controller including at least one processor. The controller is arranged to (i) determine that a vibration signal output by the vibration detection device satisfies a threshold condition and (ii) based at least on the determination that the vibration signal satisfies the threshold condition, trigger a mechanical disconnection of the driven member from the driving member by a mechanical disconnect device.

18 Claims, 7 Drawing Sheets

ENGINE ACCESSORY DISCONNECT SYSTEM

FIELD

The present disclosure relates generally to disconnect mechanisms, and more particularly, to systems and methods for triggering a disconnection of a driven member from a driving member.

BACKGROUND

Some aircraft engines include a mechanically driven accessory gearbox that drives accessory systems such as fuel pumps, scavenge pumps, electrical generators, hydraulic pumps, etc. An accessory gearbox may include a number of gears that convert the rotation of an engine shaft into different rotation speeds that are suitable for various accessory systems. Each of the accessory systems may be driven by a rotating drive shaft.

If one of the accessory systems experiences a mechanical abnormality, continued rotation of the accessory system may damage the engine or the accessory gearbox. For instance, if an accessory system experiences a loss of lubricating or cooling oil, continued rotation of the accessory system may cause the accessory system to lockup and/or overheat, which could potentially damage the engine or the accessory gearbox.

The drive shafts that drive some accessory systems are designed to break and disconnect the accessory system from the accessory gearbox when a mechanical abnormality occurs. For example, a drive shaft may, by design, include a region of reduced thickness where structural failure may occur under excessive loading. This region is commonly referred to as a shear neck. In operation, if the accessory system that is driven by the drive shaft levies excessive torque on the drive shaft, the shear neck may fail, thereby disconnecting the accessory system from the drive shaft. If, however, the shear neck is sized too large, the accessory system might not be disconnected fast enough and the malfunctioning accessory system could damage the engine or accessory gearbox. On the other hand, if the shear neck is sized too small, the accessory system might be disconnected too often.

SUMMARY

In one example, a system for disconnecting a driven member from a driving member is described. The system includes a vibration detection device configured to output vibration signals indicative of vibration levels of the driven member. The system also includes a controller including at least one processor. The controller is arranged to (i) determine that a vibration signal output by the vibration detection device satisfies a threshold condition and (ii) based at least on the determination that the vibration signal satisfies the threshold condition, trigger a mechanical disconnection of the driven member from the driving member by a mechanical disconnect device.

In another example, a method for disconnecting a driven member from a driving member is described. The method includes receiving, by a controller from a vibration detection device, a vibration signal that is indicative of a vibration level of the driven member. The method also includes determining, by the controller, that the received vibration signal satisfies a threshold condition and, based at least on the determination that the received vibration signal satisfies the threshold condition, triggering, by the controller, a mechanical disconnection of the driven member from the driving member.

In still another example, a system that includes a vibration detection device and a controller is described. The vibration detection device is configured to output vibration signals while a driving member drives a driven member. The controller includes at least one processor and is arranged to (i) determine that a vibration signal output by the vibration detection device satisfies a maintenance threshold condition and (ii) based at least on the determination that the vibration signal satisfies the maintenance threshold condition, trigger generation of a maintenance notification.

The features, functions, and advantages that have been discussed can be achieved independently in various examples or may be combined in yet other examples further details of which can be seen with reference to the following description and figures.

BRIEF DESCRIPTION OF THE FIGURES

The novel features believed characteristic of the illustrative examples are set forth in the appended claims. The illustrative examples, however, as well as a preferred mode of use, further objectives and descriptions thereof, will best be understood by reference to the following detailed description of an illustrative example of the present disclosure when read in conjunction with the accompanying figures, wherein:

DETAILED DESCRIPTION

Figure 1:
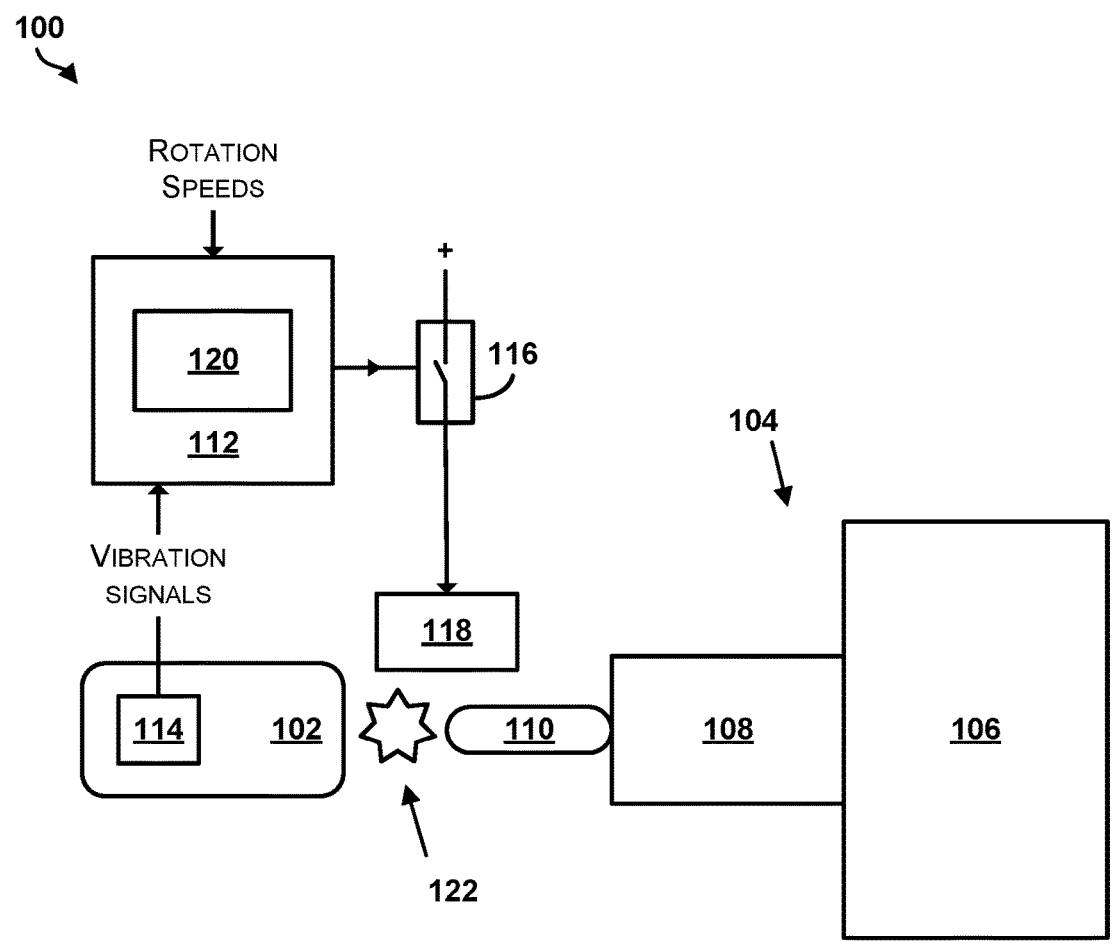
FIG. 1 illustrates an example system, according to an example embodiment.

Disclosed examples will now be described more fully hereinafter with reference to the accompanying figures, in which some, but not all of the disclosed examples are shown. Indeed, several different examples may be provided and should not be construed as limited to the examples set forth herein. Rather, these examples are provided so that this disclosure will be thorough and complete and will fully convey the scope of the disclosure to those skilled in the art.

Described herein are systems and methods for disconnecting a driven member from a driving member. One example system includes a vibration detection device and a controller. The vibration detection device is configured to output vibration signals indicative of vibration levels of the driven member. The controller, in turn, includes at least one processor, and is arranged to carry out various functions. Specifically, the controller is arranged to (i) determine that a vibration signal output by the vibration detection device satisfies a threshold condition and (ii) based at least on the determination that the vibration signal satisfies the threshold condition, trigger a mechanical disconnection of driven member from the driving member by a mechanical disconnect device. In some cases, the mechanical disconnect device may be part of the system as well.

As described further below, in one example system, the driving member is an engine and the driven member is an engine accessory. For instance, the engine may be an aircraft engine, and the driven member may be a generator, a fuel pump, an oil pump, a hydraulic pump, a compressor, or other accessory that is driven by an accessory gearbox. Further, the vibration detection device is located on the engine accessory or the accessory gearbox. In this manner, the vibration detection device may output signals indicative of vibration levels of the engine accessory, and the controller may analyze the vibration signals to determine whether the engine accessory is malfunctioning. Advantageously, upon determining that a vibration signal is indicative that the engine accessory is malfunctioning, the controller may trigger a mechanical disconnection of the driven member from the driving member by the mechanical disconnect device, thereby preventing the malfunctioning accessory from damaging the engine or the accessory gearbox.

The controller may determine that a vibration signal is indicative that an engine accessory is malfunctioning in various ways. By way of example, the controller may determine that a magnitude of a received vibration signal exceeds a disconnect threshold for actuating the mechanical disconnect device. In some instances, the disconnect threshold may vary depending on a rotation speed of the engine accessory. For instance, the disconnect threshold may increase as rotation speed increases. The controller may reference correlation data that maps rotation speeds to disconnect thresholds to determine the disconnect threshold.

In another example system, the controller may additionally or alternatively be arranged to determine that a vibration signal output by the vibration detection device satisfies a maintenance threshold condition and, based at least on the determination that the vibration signal satisfies the maintenance threshold condition, trigger generation of a maintenance memo. In this manner, the engine accessory can be proactively repaired or replaced before the engine accessory operates in an improper way.

Various other features of these systems and methods are described hereinafter with reference to the accompanying figures.

Referring now to FIG. 1, an example system 100 for disconnecting a driven member from a driving member is illustrated. In particular, FIG. 1 illustrates an example system 100 for disconnecting an engine accessory 102 from an engine 104, with the engine 104 depicted as including an engine core 106 and an accessory gearbox 108 that drives a drive shaft 110, thereby rotating the engine accessory 102. By way of example, the engine 104 may be an aircraft engine, and the engine accessory 102 may be one of various accessory systems, such as a generator, fuel pump, oil pump, hydraulic pump, compressor, etc. Although portions of this disclosure are described with respect to aircraft engines, the examples are not meant to be limiting. One of ordinary skill in the art will appreciate that the systems and methods described herein are applicable to other types of engines as well.

As further shown in FIG. 1, the example system 100 includes a controller 112, a vibration detection device 114, a relay 116, and a mechanical disconnect device 118.

The controller 112 may be or include a computer or similar device that may be configured to perform the various controller functions described herein. As shown in FIG. 1, the controller 112 may include at least one processor 120. The processor 120 may be any type of processor, such as a microprocessor, digital signal processor, multicore processor, etc., coupled to a memory (not shown). The controller may also include hardware to enable communication within the controller 112 and between the controller and one or more other devices, such as the vibration detection device 114 or other components.

The vibration detection device 114 is configured to output vibration signals indicative of vibration levels of the engine accessory 102. As an example, the vibration detection device 114 may be an accelerometer that outputs a raw vibration signal to the controller 112, and the controller may then process the vibration signal to determine a vibration level (e.g., a magnitude of vibration). Alternatively, the accelerometer may output a raw vibration signal to another device (e.g., another controller) (not shown) that processes the vibration signals to determine vibration levels and forwards the vibration levels to the controller 112. For instance, the accelerometer may output raw vibrations signal to another controller that is located on the engine 104. The controller located on the engine 104 may process the vibration signals to determine corresponding vibration levels, and then transmit the vibration levels to the controller 112. In an embodiment in which the engine 104 is an aircraft engine, the controller 112 may be located inside the aircraft.

As shown in FIG. 1, the vibration detection device 114 may be mounted on the engine accessory 102. For instance, the vibration detection device 114 may be mounted on a housing of the engine accessory 102.

The relay 116 is coupled to the mechanical disconnect device 118. Activating the relay 116 may trigger the mechanical disconnect device 118 and cause a mechanical disconnection 122 of the engine accessory from the engine 104. Specifically, activating the relay 116 may cause the mechanical disconnect device 118 to disconnect the engine accessory 102 from the engine 104. In operation, the controller 112 may send an energize relay signal to the relay 116, causing the mechanical disconnect device 118 to disconnect the engine accessory 102 from the engine 104. As discussed further below, the mechanical disconnect device 118 may take various forms, such as a cutter or a clutch.

In line with the discussion above, the controller 112 may be arranged to carry out various functions. As one example, the controller 112 may be arranged to determine whether a vibration signal output by the vibration detection device 114 satisfies a threshold condition for disconnect of the engine accessory 102. Determining whether the vibration signal satisfies a threshold condition may involve determining whether a magnitude of the vibration signal satisfies a disconnect threshold (e.g., one inch per second, one and a half inches per second, etc.). In practice, even when the engine accessory is functioning properly, the vibration detection device 114 may detect vibrations. By determining whether the magnitude of the vibration signal satisfies a disconnect threshold, the controller 112 can distinguish between normal vibration levels due to ordinary operation of the engine and an engine accessory as opposed to greater vibration levels due to an abnormally functioning engine accessory.

In some instances, the disconnect threshold may vary depending on a rotation speed of the engine accessory at a time corresponding to a time when the vibration signal was obtained. In operation, the controller 112 may receive an indication of a rotation speed of the engine accessory, and reference correlation data that maps rotation speeds to disconnect thresholds to determine the disconnect threshold.

Further, based at least on a determination that a received vibration signal satisfies a threshold condition, the controller 112 may trigger a mechanical disconnection of the engine accessory 102 from the engine 104. For instance, the controller 112 may cause the mechanical disconnect device 118 to disconnect the engine accessory 102 from the engine 104 by sending a signal to energize the relay 116.

In some examples, determining whether the vibration signal satisfies a threshold condition may also involve determining whether the vibration signal satisfies the threshold condition for at a least a predetermined time period. By way of example, the controller 112 may be arranged to determine whether a magnitude of the vibration signal continuously exceeds a disconnect threshold for a given time period (e.g., ten seconds, thirty seconds, one minute, etc.). In this manner, the controller 112 can avoid inadvertently disconnecting the engine accessory 102 from the engine 104 due to a temporarily erroneous vibration signal.

Further in line with the discussion above, the controller 112 may additionally or alternatively be arranged to determine whether a vibration signal output by the vibration detection device 114 satisfies a maintenance threshold condition. For instance, the controller 112 may be arranged to determine whether a magnitude of the received vibration signal exceeds a maintenance threshold (e.g., half an inch per second, one inch per second, etc.). In some instances, the maintenance threshold may vary depending on a rotation speed of the engine accessory at a time corresponding to a time when the vibration signal was obtained. In operation, the controller 112 may receive an indication of a rotation speed of the engine accessory, and reference correlation data that maps rotation speeds to maintenance thresholds to determine the maintenance threshold.

Further, based at least on a determination that a received vibration signal satisfies a maintenance threshold condition, the controller 112 may trigger generation of a maintenance notification. For instance, the controller 112 may generate a maintenance memo and send the maintenance memo to a maintenance computer (not shown). In one example, the maintenance memo may include the received vibration signal and, optionally, the disconnect threshold. Further, the maintenance memo may include one or any combination of a date, time, rotation speed, and identification of the engine accessory. In some instances, the maintenance memo may include a log of magnitudes of vibration and rotation speeds for a period of time prior to generation of the maintenance memo, such as a log of magnitudes and rotation speeds for the previous five minutes, one hour, etc.

In some examples, determining that the vibration signal satisfies a maintenance threshold condition may involve determining that a magnitude of the vibration signal exceeds a maintenance threshold but does not exceed a disconnect threshold. Thus, if the magnitude of the vibration signal is not high enough to warrant disconnecting the engine accessory 102 from the engine 104, the controller 112 can nevertheless generate a maintenance notification. In some cases, after disconnecting the engine accessory 102 from the engine 104 using the mechanical disconnect device 118, the engine 104 is removed from service until the engine accessory is replaced. Generating a maintenance notification before the engine accessory needs to be disconnected may allow an operator to proactively schedule the engine accessory 102 for service before the engine accessory operates in an improper way, thereby reducing engine downtime.

Further, in some examples, determining whether the vibration signal satisfies a maintenance threshold condition may also involve determining whether the vibration signal satisfies the maintenance threshold condition for at a least a predetermined time period. By way of example, the controller 112 may be arranged to determine whether a magnitude of the vibration signal continuously exceeds a maintenance threshold but not a disconnect threshold for a given time period (e.g., ten seconds, thirty seconds, one minute, etc.). In this manner, the controller 112 can avoid inadvertently generating a maintenance notification due to a temporarily erroneous vibration signal.

Figure 2:
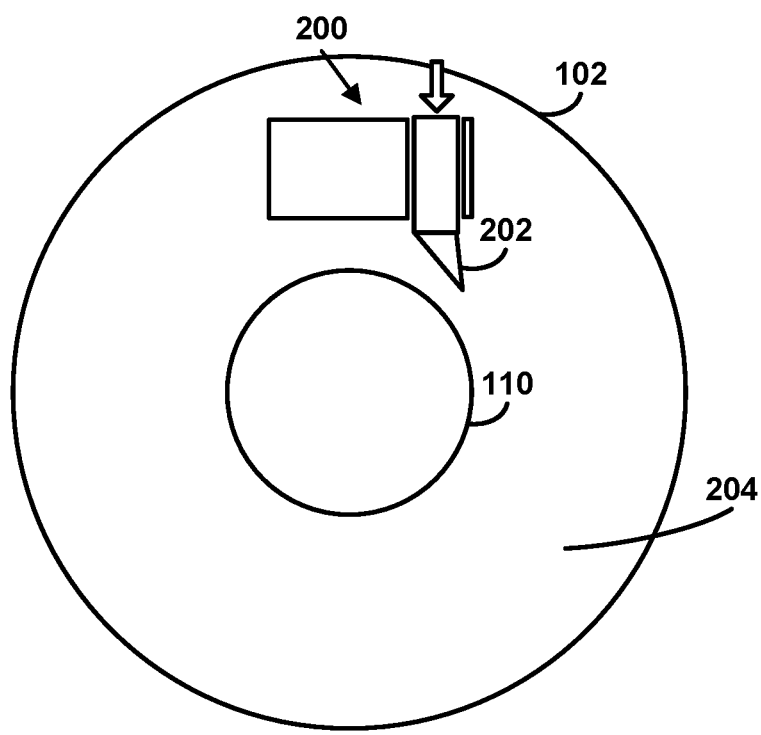
FIG. 2 illustrates an example mechanical disconnect device, according to an example embodiment.

FIG. 2 illustrates an example mechanical disconnect device 200. The mechanical disconnect device 200 may represent the mechanical disconnect device 118 of FIG. 1. As such, the mechanical disconnect device 200 may be configured to mechanically disconnect the engine accessory 102 from the engine 104.

As shown in FIG. 2, the mechanical disconnect device 200 includes a cutter 202 configured to sever the drive shaft 110 driving the engine accessory 102. The cutter 202 in FIG. 2 is shown mounted to a first surface 204 of the engine accessory, with the first surface 204 being a surface facing the accessory gearbox 108. In other configurations, the cutter 202 may be mounted in other ways, such as by being mounted to the accessory gearbox 108.

The cutter 202 may be spring loaded such that the cutter 202 can be moved radially towards the drive shaft 110 and into engagement with the drive shaft 110. The drive shaft 110 in the region of the cutter 202 may be formed as a shear neck. When the cutter 202 engages the drive shaft 110, friction between the cutter 202 and the drive shaft 110 may cause the drive shaft 110 to sever into two portions, thereby disconnecting the drive shaft 110 and the engine accessory 102.

Figure 3:
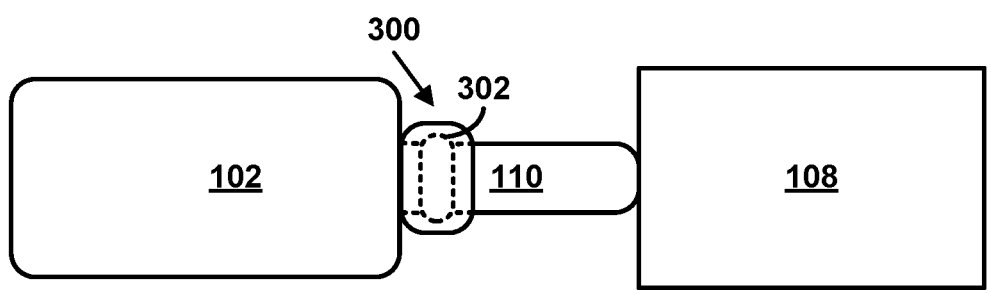
FIG. 3 illustrates another example mechanical disconnect device according to an example embodiment.

FIG. 3 illustrates another example mechanical disconnect device 300. The mechanical disconnect device 300 may represent the mechanical disconnect device 118 of FIG. 1. As such, the mechanical disconnect device 300 may be configured to mechanically disconnect the engine accessory 102 from the engine 104. For ease of illustration, only the accessory gearbox 108 of the engine 104 is shown in FIG. 3.

As shown in FIG. 3, the mechanical disconnect device 300 includes a clutch 302. The clutch 302 may be operable to disengage the drive shaft 110 from the engine accessory 102, thereby preventing the drive shaft 110 from rotating the engine accessory 102.

The example mechanical disconnect devices 200, 300 of FIGS. 2 and 3 are not meant to be limiting. Example systems may include other types of mechanical disconnect devices as well.

Figure 4:
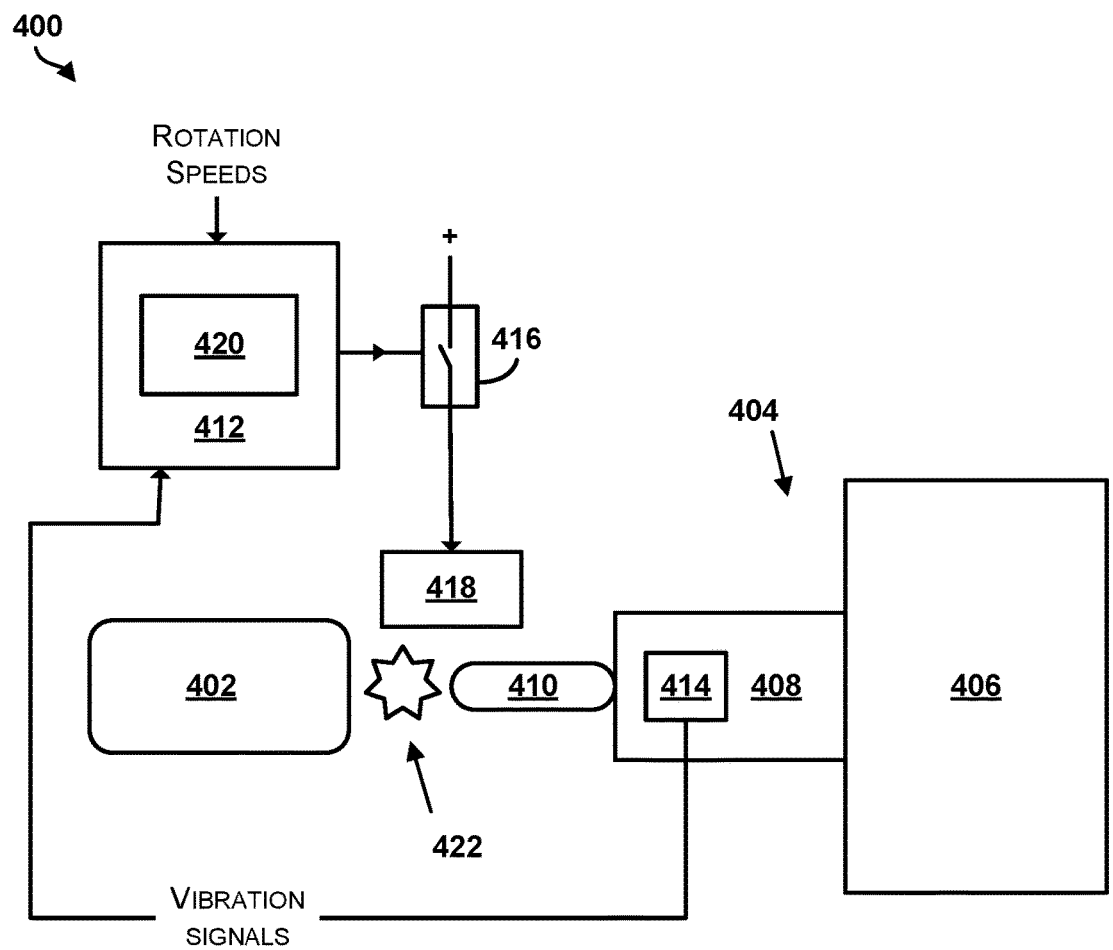
FIG. 4 illustrates another example system, according to an example embodiment.

FIG. 4 illustrates another example system 400 for disconnecting a driven member from a driving member. Like FIG. 1, FIG. 4 illustrates an example system 400 for disconnecting an engine accessory 402 from an engine 404, with the engine 404 depicted as including an engine core 406 and an accessory gearbox 408 that drives a drive shaft of 410. And like the example system 100 of FIG. 1, the example system 400 includes a controller 412, a vibration detection device 414, a relay 416, and mechanical disconnect device 418. Further, like the example system 100 of FIG. 1, the controller 412 includes at least one processor 420, and the mechanical disconnect device 418 is operable to cause a mechanical disconnection 422 of the engine accessory 402 and the engine 404.

However, unlike in the example system 100 of FIG. 1, in the example system 400, the vibration detection device 414 is mounted on the accessory gearbox 408. In one example, the vibration detection device 414 may be mounted on a housing of the accessory gearbox 408. If the vibration detection device 414 is mounted on the accessory gearbox 408 rather than on the engine accessory 402, the vibration detection device 414 might not need to be replaced when then engine accessory 402 is replaced.

As described above with respect to the controller 112 of FIG. 1, although the vibration detection device 414 is shown outputting vibration signals to the controller 412, the vibration detection device 414 may instead output vibration signals to another device (e.g., another controller (not shown) that processes the vibration signals to determine vibration levels and forwards the vibration levels to the controller 412. For instance, the vibration detection device 414 may output raw vibrations signal to another controller that is located on the engine 404. The controller located on the engine 404 may process the vibration signals to determine corresponding vibration levels, and then transmit the vibration levels to the controller 412. In an embodiment in which the engine 404 is an aircraft engine, the controller 412 may be located inside the aircraft.

Figure 5:
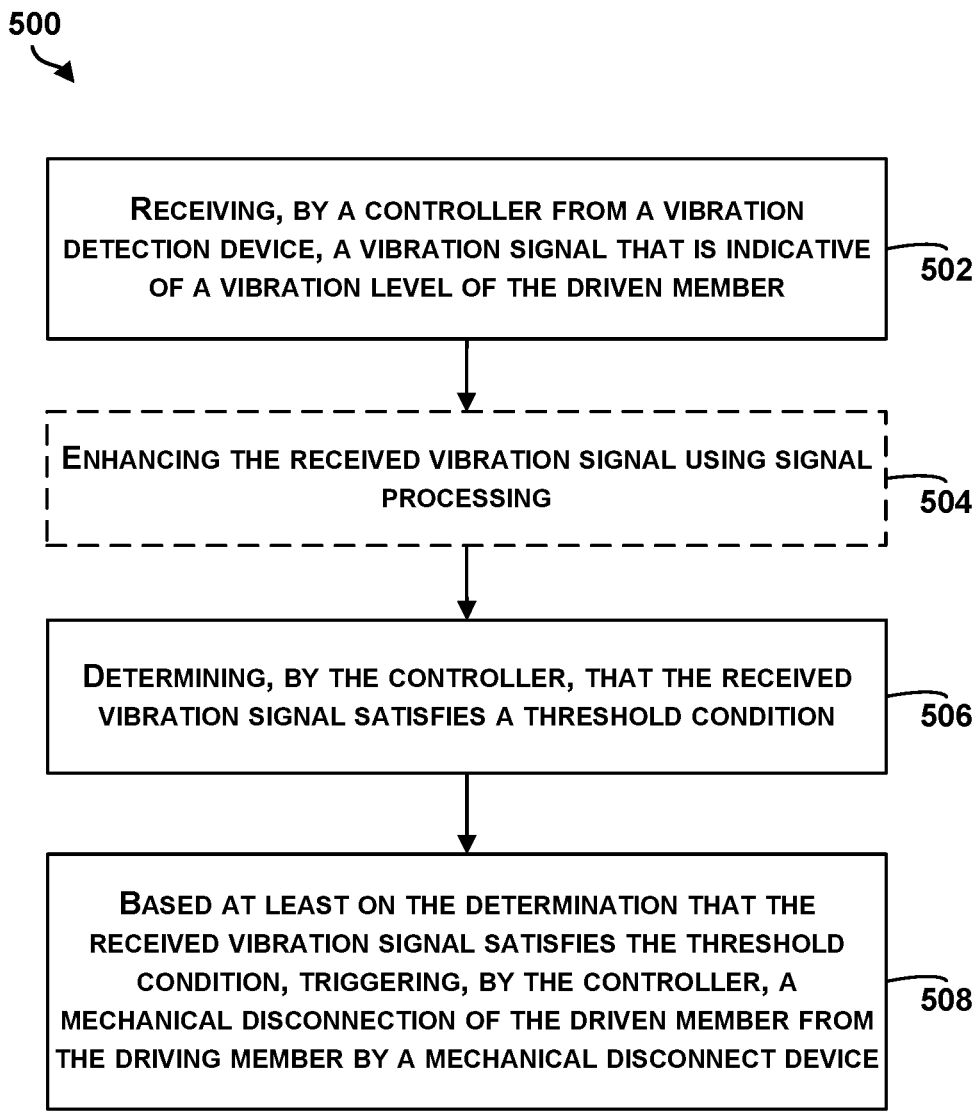
FIG. 5 shows a flowchart of an example method, according to an example embodiment.

FIG. 5 shows a flowchart of an example method 500 for disconnecting a driven member, such as the engine accessory 102, 402 (shown in FIGS. 1-4), from a driving member, such as the engine 104, 404 (shown in FIGS. 1 and 4). Method 500 shown in FIG. 5 presents an embodiment of a method that, for example, could be carried out by a controller, such as either of the controllers 112, 412 (shown in FIGS. 1 and 4).

It should be understood that for this and other processes and methods disclosed herein, flowcharts show functionality and operation of one possible implementation of present embodiments. Alternative implementations are included within the scope of the example embodiments of the present disclosure in which functions may be executed out of order from that shown or discussed, including substantially concurrent or in reverse order, depending on the functionality involved, as would be understood by those reasonably skilled in the art.

Referring to FIGS. 1-5, at block 502, the method 500 includes receiving, by a controller 112, 412 from a vibration detection device 114, 414, a vibration signal that is indicative of a vibration level of the driven member. Optionally, at block 504, the method 500 includes enhancing the received vibration signal using signal processing. At block 506, the method 500 includes determining, by the controller 112, 412, that the received vibration signal satisfies a threshold condition. And at block 508, the method 500 includes, based at least on the determination that the received vibration signal satisfies the threshold condition, triggering, by the controller 112, 412, a mechanical disconnection of the driven member from the driving member by a mechanical disconnect device 118, 200, 300, 418.

In line with the discussion above, the driven member may be an engine accessory and the driving member may be an engine. Further, the vibration detection device 114, 414 may be located on the engine accessory or on an accessory gearbox of the engine, such that the vibration detection device 114, 414 outputs vibration signals indicative of vibration levels of the engine accessory.

Enhancing the received vibration signal using signal processing may distinguish vibrations due to the driven member from vibrations do to other sources of vibration. In some examples, the controller 112, 412 may perform signal processing functions like shaft order tracking, harmonic analysis, side-band detection, or other signal processing methods to enhance the received vibration signal before determining whether the received vibration signal satisfies the threshold condition. In this manner, the controller 112, 412 can more easily distinguish can more easily distinguish vibrations caused by the engine accessory that is being monitored from vibrations caused by other sources of vibration.

In one example, the controller 112, 412 may determine that for at least a predetermined time period a magnitude of the received vibration signal exceeds a disconnect threshold. Based at least on the determination, the controller 112, 412 may cause a mechanical disconnect device 118, 200, 300, 418 to disconnect the engine accessory from the engine. Causing the mechanical disconnect device 118, 200, 300, 418 to disconnect the engine accessory from the engine may involve the controller 112, 412 actuating the mechanical disconnect device 118, 200, 300, 418, thereby causing the mechanical disconnect device 118, 200, 300, 418 to disconnect the driven member from the driving member.

Figure 6:
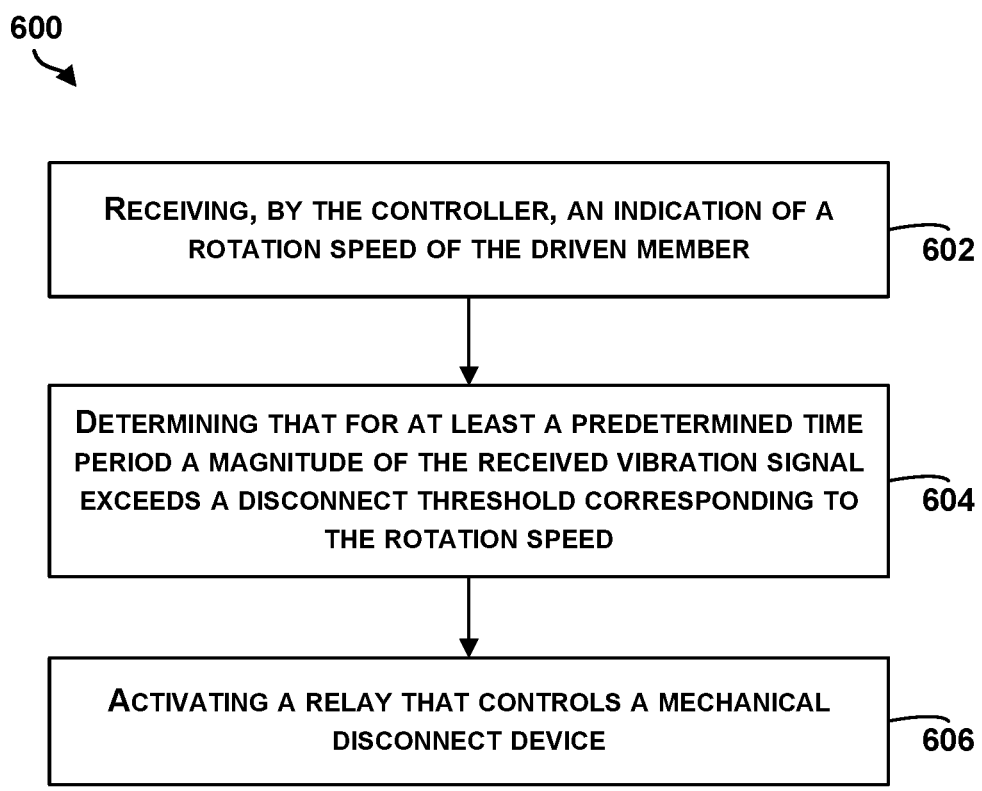
FIG. 6 shows a flowchart of another example method for use with the method shown in FIG. 5, according to an example embodiment.

FIG. 6 shows a flowchart of another example method 600 for use with the method 500 shown in FIG. 5. Referring to FIGS. 1-6, at block 602, FIG. 6 includes receiving, by the controller 112, 412, an indication of a rotation speed of the driven member. At block 604, FIG. 6 includes determining that for at least a predetermined time period a magnitude of the received vibration signal exceeds a disconnect threshold corresponding to the rotation speed. And at block 606, FIG. 6 includes activating a relay 116, 416 that controls a mechanical disconnect device 118, 200, 300, 418.

In line with the discussion above, the driven member may be an engine accessory and the driving member may be an engine. In some examples, while the controller 112, 412 receives vibration signals, the controller 112, 412 may also receive rotation speeds that correspond to the vibration signals. For instance, the vibration detection device 114, 414 may be mounted to an engine accessory or an accessory gearbox that drives the engine accessory, and as the vibration detection device 114, 414 outputs vibration signals, a rotation detection device may also output to the controller data indicative of rotation speeds of the engine accessory. The data may be the rotation speed of the engine accessory, or the data may be the rotation speed of another component from which the controller 112, 412 may derive the rotation speed of the engine accessory.

In some examples, the controller 112, 412 may determine the disconnect threshold based on the indicated rotation speed. For instance, the controller 112, 412 may reference correlation data that maps rotation speeds to disconnect thresholds to determine the disconnect threshold.

Further, in some examples, the controller 112, 412 may be arranged to store received indications of rotation speed and received vibration signals in association with one another using time stamps or a similar association technique. For instance, the controller 112, 412 may, on a fixed interval basis (e.g., every 30 ms, 500 ms, 1 s, etc.), receive a magnitude of vibration and a corresponding indication of rotation speed, and then store the received magnitude and rotation speed in association with one another in a data structure for subsequent retrieval. Or the controller 112, 412 may be arranged to split the received vibration signals into different vibration signal samples and, for each sample, store an indication of rotation speed. In this manner, when analyzing a particular sample of vibration signals, the controller 112, 412 can compare the sample of vibration signals with a disconnect threshold corresponding to a rotation speed at which the engine accessory was rotating when the sample of vibration signals was obtained.

Figure 7:
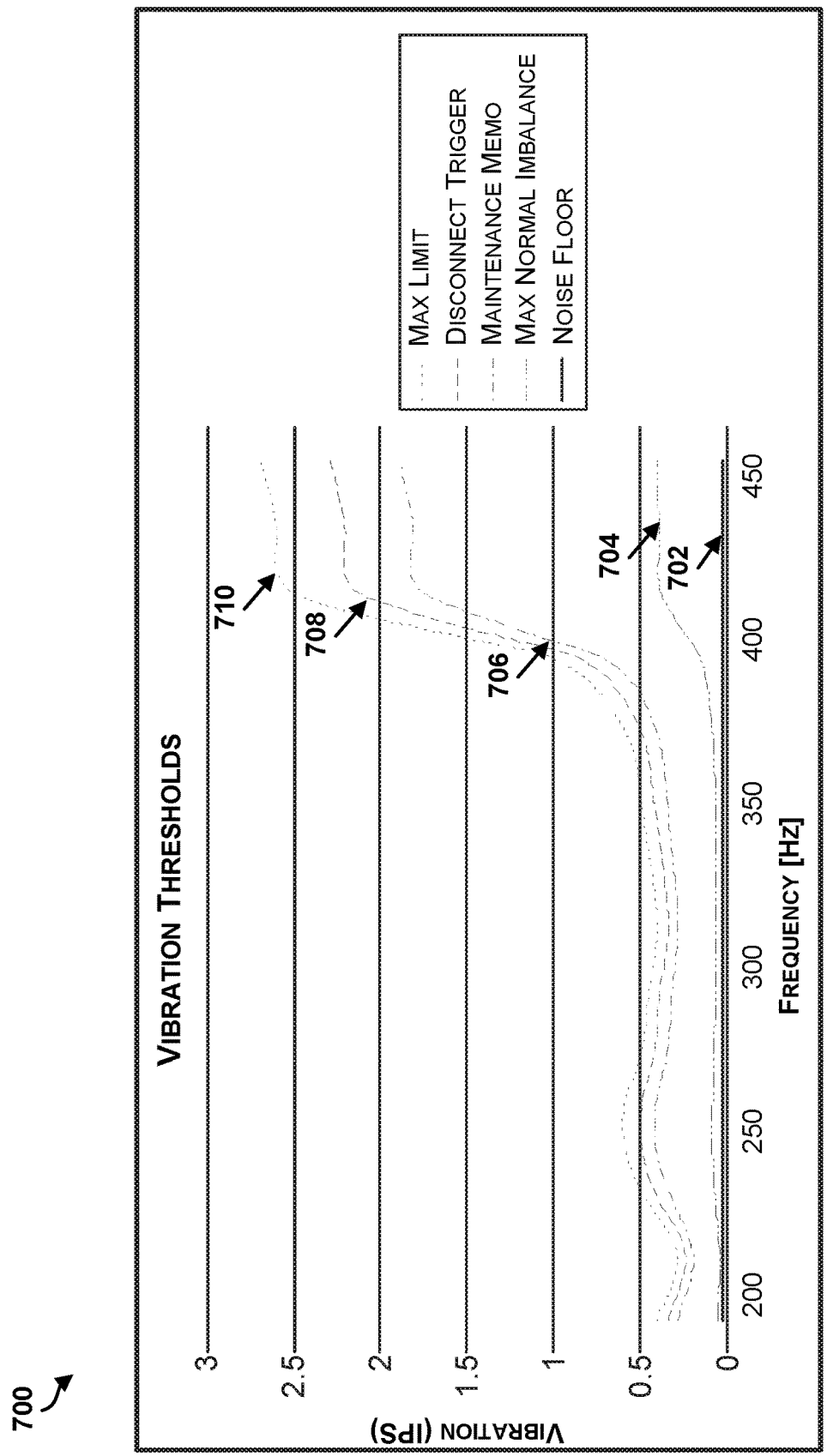
FIG. 7 shows a graph of example vibration levels and thresholds, according to an example embodiment.

FIG. 7 shows a graph 700 of example vibration levels and thresholds. In particular, the graph 700 depicts various vibration levels and thresholds for an example engine accessory as a function of frequency. For a rotating engine accessory, a frequency of one Hertz is equivalent to one rotation of the engine accessory per second.

As shown in FIG. 7, the graph 700 includes a noise floor curve 702, a normal imbalance curve 704, a maintenance memo threshold curve 706, a disconnect trigger threshold curve 708, and a maximum acceptable vibration curve 710.

The noise floor curve 702 represents a level of noise that may be present in a vibration signal at various frequencies. The noise may, for instance, be electrical noise due to the circuitry of the vibration detection device or components of the engine accessory or accessory gearbox.

The normal imbalance curve 704 represents a normal vibration level at various frequencies when the engine accessory is properly functioning.

The maximum acceptable vibration curve 710 represents a maximum acceptable vibration level at various frequencies. This limit may be set by a regulatory body and may depend on the type of engine system at issue.

Depending on the desired implementation, an operator may configure the maintenance memo threshold curve 706 and disconnect trigger threshold curve 708 at suitable locations. As shown in the graph 700, the maintenance memo threshold curve 706 and the disconnect trigger threshold curve 708 are both below the maximum acceptable vibration curve 710, with the maintenance memo threshold curve 706 below the disconnect trigger threshold curve 708.

In practice, representations of the maintenance memo threshold curve 706 and the disconnect trigger threshold curve 708 may be stored in a table, and a controller, such as any of the controllers described herein, may use the stored representations to facilitate carrying out the various controller functions described herein. By way of example, with the example disconnect trigger threshold curve 708, if the controller receives a vibration signal indicating a magnitude of two inches per second while the engine accessory is rotating at a frequency of 425 Hertz, the controller may determine that the magnitude is less than a disconnect threshold of 2.2 inches per second corresponding to the frequency of 425 Hertz, such that it is not necessary to trigger a mechanical disconnection of the engine accessory. On the other hand, for the example maintenance memo threshold curve 706, the controller may determine that the magnitude of two inches per second exceeds a maintenance threshold of 1.8 inches per second corresponding to the frequency of 425 Hertz, and responsively trigger generation of a maintenance notification.

The description of the different advantageous arrangements has been presented for purposes of illustration and description, and is not intended to be exhaustive or limited to the examples in the form disclosed. After reviewing and understanding the foregoing disclosure, many modifications and variations will be apparent to those of ordinary skill in the art. Further, different examples may provide different advantages as compared to other examples. The example or examples selected are chosen and described in order to best explain the principles, the practical application, and to enable others of ordinary skill in the art to understand the disclosure for various examples with various modifications as are suited to the particular use contemplated.

What is claimed is:

1. A system for disconnecting a driven member from a driving member, the system comprising:
   a vibration detection device configured to output vibration signals indicative of vibration levels of the driven member; and
   a controller comprising at least one processor, the controller arranged to (i) receive an indication of a rotation speed of the driven member, (ii) determine a disconnect threshold based on the rotation speed, (iii) determine that a vibration signal output by the vibration detection device satisfies a threshold condition, and (iv) based at least on the determination that the vibration signal satisfies the threshold condition, trigger a mechanical disconnection of the driven member from the driving member by a mechanical disconnect device,
   wherein determining that the vibration signal output by the vibration detection device satisfies the threshold condition comprises determining that a magnitude of the vibration signal exceeds the disconnect threshold.

2. The system of claim 1, further comprising the mechanical disconnect device.

3. The system of claim 2, further comprising a relay, wherein triggering the mechanical disconnection comprises activating the relay to trigger the mechanical disconnection.

4. The system of claim 2, wherein the mechanical disconnect device comprises a cutter configured to sever a drive shaft of the driven member.

5. The system of claim 2, wherein the mechanical disconnect device comprises a clutch configured to disengage the driven member from the driving member.

6. The system of claim 1, wherein the vibration detection device comprises an accelerometer.

7. The system of claim 1:
   wherein the driving member comprises an engine, and
   wherein the driven member comprises an engine accessory.

8. The system of claim 7, wherein the engine comprises an aircraft engine.

9. The system of claim 7, wherein the engine accessory comprises an engine accessory selected from the group consisting of: a generator, a fuel pump, an oil pump, a hydraulic pump, and a compressor.

10. The system of claim 7, wherein the vibration detection device is located on the engine accessory or is located on an accessory gearbox that drives the engine accessory.

11. A method for disconnecting a driven member from a driving member, the method comprising:
   receiving, by a controller, an indication of a rotation speed of the driven member;
   determining, by the controller, a disconnect threshold based on the rotation speed;
   receiving, by the controller from a vibration detection device, a vibration signal that is indicative of a vibration level of the driven member;
   determining, by the controller, that the received vibration signal satisfies a threshold condition, wherein determining that the received vibration signal satisfies the threshold condition comprises determining that a magnitude of the received vibration signal exceeds the disconnect threshold; and
   based at least on the determination that the received vibration signal satisfies the threshold condition, triggering, by the controller, a mechanical disconnection of the driven member from the driving member by a mechanical disconnect device.

12. The method of claim 11, wherein determining that the magnitude of the received vibration signal exceeds the disconnect threshold corresponding to the rotation speed comprises determining that for at least a predetermined time period the magnitude of the received vibration signal exceeds the disconnect threshold corresponding to the rotation speed.

13. The method of claim 11, further comprising enhancing the received vibration signal using signal processing before determining that the received vibration signal satisfies the threshold condition, wherein enhancing the received vibration signal distinguishes vibrations due to the driven member from vibrations due to other sources of vibration.

14. The method of claim 11, wherein triggering the mechanical disconnection comprises activating a relay that controls the mechanical disconnect device.

15. A system comprising:
- a vibration detection device configured to output vibration signals while a driving member drives a driven member; and
- a controller comprising at least one processor, the controller arranged to (i) determine that a vibration signal output by the vibration detection device satisfies a maintenance threshold condition (ii) based at least on the determination that the vibration signal satisfies the maintenance threshold condition, trigger generation of a maintenance notification,
- wherein determining that the vibration signal satisfies the maintenance threshold condition comprises determining that a magnitude of the vibration signal exceeds a maintenance threshold but does not exceed a disconnect threshold.

16. The system of claim 15:
wherein the driving member comprises an engine, and
wherein the driven member comprises an engine accessory.

17. The system of claim 16, wherein the vibration detection device is located on the engine accessory or is located on an accessory gearbox that drives the engine accessory.

18. The system of claim 16, wherein the engine comprises an aircraft engine.

\* \* \* \* \*